United States Patent
DeHaan

(10) Patent No.: US 8,688,830 B2
(45) Date of Patent: *Apr. 1, 2014

(54) ABSTRACTING STORAGE VIEWS IN A NETWORK OF COMPUTING SYSTEMS

(75) Inventor: Michael Paul DeHaan, Morrisville, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,522

(22) Filed: Dec. 15, 2011

(65) Prior Publication Data

US 2012/0089729 A1   Apr. 12, 2012

Related U.S. Application Data

(63) Continuation of application No. 12/551,486, filed on Aug. 31, 2009, now Pat. No. 8,090,833.

(51) Int. Cl.
*G06F 15/173* (2006.01)

(52) U.S. Cl.
USPC ............ 709/224; 709/226; 709/201; 709/218

(58) Field of Classification Search
USPC .......................... 709/224, 201, 226; 718/104
See application file for complete search history.

(56) References Cited

U.S. PATENT DOCUMENTS

| | | | |
|---|---|---|---|
| 2003/0233446 A1* | 12/2003 | Earl | 709/224 |
| 2005/0076154 A1 | 4/2005 | Chambliss et al. | |
| 2006/0238381 A1 | 10/2006 | Kimchi et al. | |
| 2009/0138884 A1* | 5/2009 | Kakeda et al. | 718/104 |
| 2009/0144393 A1* | 6/2009 | Kudo | 709/218 |
| 2009/0300180 A1 | 12/2009 | DeHaan | |
| 2010/0250642 A1* | 9/2010 | Yellin et al. | 709/201 |

* cited by examiner

*Primary Examiner* — Kyung H Shin
(74) *Attorney, Agent, or Firm* — Lowenstein Sandler LLP

(57) ABSTRACT

A storage tool can determine and provide an abstract view of storage systems in a network of computing system. The storage tool can utilize the abstract view in order to identify the storage systems based on the performance and capabilities of the storage systems without regard to the configuration of the storage system, storage devices in the storage system, or the details of the storage devices.

23 Claims, 5 Drawing Sheets

| ID | LOCATION | TYPE | CONFIG. | STORAGE DEVICES | STORAGE | PERFORMANCE AND CAPABILITIES METRICS |
|---|---|---|---|---|---|---|
| MAC = 0001 | 126.0.1 | SINGLE | NA | IBM MODEL IF23 | 500 GB | FAIL RATE: 1X10$^{-6}$ FAIL/HOUR MTTDL: 50,000 HOURS |
| MAC = 0002 | 126.1.1 | ARRAY 4 DEVICES | RAID 5 | WD MODEL IB63 WB MODEL IB63 | 1 TB | SPACE EFF: n-1 REDUNDANCY: 1 ... |
| ... | | | | | | |

FIG. 2

ABSTRACTING STORAGE VIEWS IN A NETWORK OF COMPUTING SYSTEMS

RELATED APPLICATIONS

This application is a continuation of U.S. patent application Ser. No. 12/551,486 filed on Aug. 31, 2009, now U.S. Pat. No. 8,090,833 the entire contents of which are hereby incorporated by reference herein.

FIELD

This invention relates generally to network management.

DESCRIPTION OF THE RELATED ART

Most entities such as companies and universities operate large networks of computing systems. These networks are typically made up of a wide variety of computing systems, such as servers providing various services and individual computing systems. As such, the computing systems in the network varying greatly in the hardware and software contained in the computing systems. Additionally, the computing systems in the network are often located in different physical locations. For example, a company may operate a network which spans multiple geographic regions (e.g. cities, countries, continents) and multiple regions in a single geographic region (e.g. multiple office building, different floors in the office building, different offices in the office building).

One or more system administrators are tasked with the job of tracking and maintaining the computing systems in the network. This involves diagnosing and fixing problems in the computing systems, insuring that the systems are properly configured, and the like. This involves also installing and maintaining the software programs running in the network. In order to install the software programs and ensure that the programs run properly after installation, the system administrators must know details about the storage devices of the computing systems of the network. The system administrators must know the details so that the administrator can ensure that the storage devices have the adequate resources and performance to support the software programs to install. However, the network typically contains many different types of storage devices which are configured in variety of schemes. As such, the systems administrators must expend significant time and effort identifying the storage devices in the network.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 2 illustrates an exemplary inventory record of storage systems in the network, according to various embodiments;

DETAILED DESCRIPTION OF EMBODIMENTS

Figure 1:
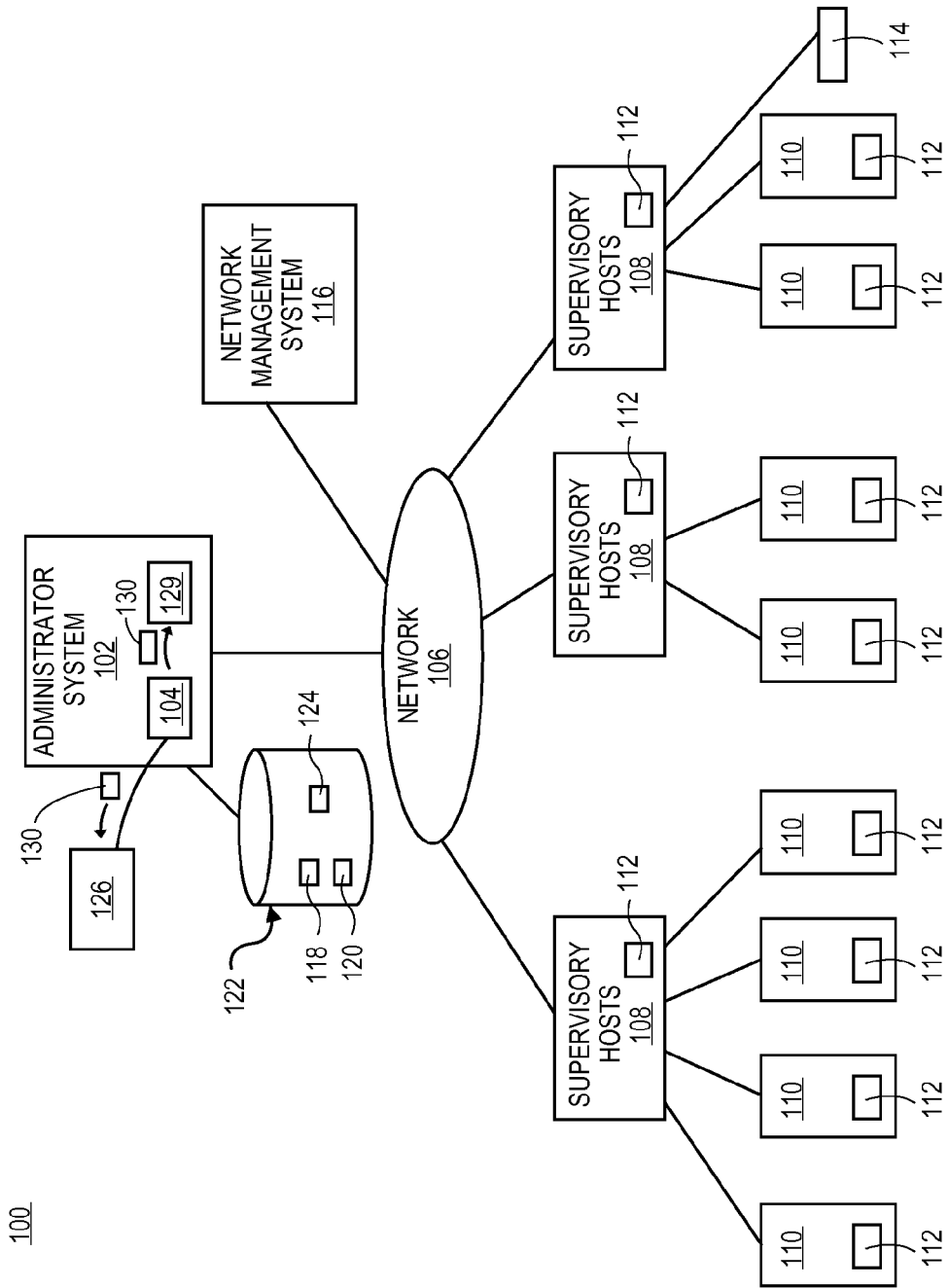
FIG. 1 illustrates a network of computing systems implementing a storage tool, in which various embodiments of the present teachings can be practiced.

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for managing a network of computing systems and devices. More particularly, a storage tool can provide an abstract view of the storage systems of the network that allows for identification and utilization of the storage systems based on performance and capabilities of the storage systems.

According to embodiments, an administrator system, located in a network of computing systems, can be configured to include a storage tool. The storage tool can be configured to determine and provide an abstract view of storage systems in a network of computing system. The storage tool can be configured to utilize the abstract view in order to identify the storage systems based on the performance and capabilities of the storage systems without regard to the configuration of the storage system, storage devices in the storage system, or the details of the storage devices.

According to embodiments, the storage tool can be configured to identify storage systems contained in the network and determine the performance and capabilities of the storage systems. To identify the storage systems, the storage tool can be configured to query the network, directly, or communicate with a network management system to locate the storage systems of the network. During identification, the storage tool can be configured to collect details of the storage systems such as location and identification of the storage systems (network address of storage systems or computing systems containing the storage systems), a type of the storage systems (individual storage device, array of storage devices), configuration of the storage systems (e.g. scheme of the array of storage devices), information about storage devices contained in the storage systems (manufacturer, model, interface type, etc.), and available storage of the storage systems.

According to embodiments, once the storage systems are identified, the storage tool can be configured to determine overall performance and capabilities metrics of each storage system. The overall performance and capabilities metrics can include any conventional metric that describes how the storage system performs in storing data and the capabilities of the storage system. For example, the storage tool can determine failure rate, mean time to data loss (MTTDL), mean time to recovery (MTTR), unrecoverable bit rate error (UBE), write cache reliability, redundancy, space efficiency, storage system configuration (e.g. RAID level or supported RAID level) and the like for each storage system. In order to determine the overall performance and capabilities metrics, the storage tool can be configured to maintain a device record and a configuration record. The device record can include standard performance and capabilities metrics for storage devices from various manufacturers. The configuration record can include standard performance and capabilities metrics for various configurations of storage systems and can include factors that define how various configurations of storage systems affects the standard performance and capabilities metrics of the storage devices in the storage systems.

According to embodiments, to determine the overall performance and capabilities metrics of a particular storage system, the storage tool can be configured to search the device record and retrieve the standard performance and capabilities metrics of each storage device in the particular storage system. Additionally, the storage tool can be configured to search the configuration record and retrieve the standard performance and capabilities metrics for the configuration of the particular storage system and the factors that define how the configuration of the particular storage system affects the standard performance and capabilities metrics of the storage devices in the storage systems. For the particular storage systems, the storage tool can be configured to select the retrieved standard performance and capabilities metrics and/or apply the retrieved factors to the retrieved standard performance and capabilities metrics to determine the overall performance and capabilities metrics for the particular storage system.

According to embodiments, once the overall performance and capabilities metrics are determined for the storage systems, the storage tool can be configured to store the overall performance and capabilities metrics of the storage systems with the details of the storage systems in an inventory record. The inventory record can include, for each storage system, the details of the storage systems such as location and identification of the storage systems, type of the storage systems, configuration of the storage systems, information about storage devices contained in the storage systems, available storage of the storage systems, and the overall performance and capabilities metrics.

According to embodiments, the storage tool can be configured to identify storage systems based on the overall performance and capabilities metrics. The storage tool can be configured to receive a request to identify storage systems that meet one or more overall performance and capabilities metrics. To determine the storage systems that meet the one or more overall performance and capabilities metrics, the storage tool can be configured to search the inventory record and identify storage systems that meet the one or more overall performance and capabilities metrics. The storage tool can be configured to provide a report of the identified storage systems to an originator of the request.

By utilizing the storage tool, the administrator system can provide robust tools for identifying storage systems based on desired performance and capabilities. Consequently, an administrator or program attempting to identify storage is not required to know the details of the storage systems in the network. As such, the services tool can reduce the time and effort of managing the network.

FIG. 1 illustrates a network system 100, according to various embodiments of the present teachings. In embodiments as shown, an administrator system 102 can include a storage tool 104 for identifying storage systems in the network system 100 and providing an abstract view of the storage systems. While FIG. 1 illustrates a number of computing systems connected by one or more networks, one skilled in the art will realize that network system 100 can comprise any number of computing system and networks.

In embodiments, the network system 100 can include a number of computing systems connected by one or more networks 106. In embodiments, the one or more networks 106 can be or include the Internet, or other public or private networks. The one or more or more networks 106 can be or include wired, wireless, optical, and other network connections. One skilled in the art will realize that the one or more networks 106 can be any type of network, utilizing any type of communication protocol, to connect the computing systems.

In embodiments as illustrated in FIG. 1, the computing systems in the network system 100 can include a variety of different computing systems. The network system 100 can include a number of supervisory hosts 108. The supervisory hosts 108 can be or include a set of servers configured to communicate with entities at other levels of the network system 100 such as the one or more networks and/or associated connections. The supervisory hosts 108 can be configured to communicate with an intermediate set or sets of hosts, gateways, or servers. The supervisory hosts 108 can be configured to function as "overlord" hosts or servers which communicate with an underlying or low-level computing systems 110, or other devices in the network system 100. The computing systems 110 can include any type of computing systems or other devices such as servers, personal computers, laptop computers, network-enabled media devices, networked stations, etc.

In embodiments, the supervisory hosts 108 can be configured to support or serve underlying networks in the network system 100, for example via a local area network, or other network(s) or connections. Other hierarchies, topologies, and connections between the supervisory hosts 108, any intermediate hosts, the computing systems 110, and/or other entities or devices of the network system 100 can be used.

In embodiments, the supervisory hosts 108 and the computing systems 110 can include any number and types of software programs and packages. Likewise, the supervisory host 108 and the computing systems 110 can include components of conventional computing systems, such as processors, memory, storage, network devices, input/output devices, and the like.

In embodiment, the network system 100 can be configured to include a number of storage systems 112 and 114. The storage systems 112 can be any type of storage systems included in the supervisory hosts 108 and computing systems 110 to provide storage for software programs, files, data, and the like. For example, the storage systems 112 can be individual computer readable storage devices. Likewise, for example, the storage systems 112 can be an array of multiple computer readable storage devices configured to deliver storage as one logical unit. In this example, the multiple storage devices can be configured to cooperate as one logical unit utilizing any type of open-source or proprietary systems and protocols, such as hardware based Redundant Array of Independent Disks (RAID) schemes, software based RAID schemes, and the like.

In embodiments, the storage system 114 can be a network-based storage system that is coupled to the network 106 and configured to provide storage to the network system 100 without being incorporated into the supervisory hosts 108 or computing systems 110. The storage system 114 can be individual computer readable storage devices. Likewise, for example, the storage systems 114 can be an array of multiple computer readable storage devices configured to deliver storage as one logical unit. In this example, the multiple storage devices can be configured to cooperate as one logical unit utilizing any type of open-source or proprietary systems and protocols, such as hardware based RAID schemes, software based RAID schemes, and the like.

In embodiments, the administrator system 102 can be any type of computing system or other device such as such as a server, personal computer, laptop computer, network-enabled media device, networked station, etc. The administrator system 102 can be coupled to the one or more networks 106 in order to communicate with the supervisory hosts 108 and the computing systems 110. For example, the administrator system 102 can be operated by an administrator or user to monitor and configure the supervisory hosts 108, the computing systems 110, and the storage systems 112 and 114 in the network system 100.

In embodiments, the administrator system 102 can be configured to include the storage tool 104. The storage tool 104 can be configured to determine and provide an abstract view of the storage systems 112 and 114 in the network system 100. The storage tool 104 can be configured to utilize the abstract view in order to identify the storage systems 112 and 114 based on the performance and capabilities of the storage systems 112 and 114 without regard to the configuration of the storage system 112 and 114, storage devices in the storage system 112 and 114, or the details of the storage devices.

In embodiments, the storage tool 104 can be implemented as a software programs that is configured to execute on the administrator system 102 or any other computing system in the network system 100 Likewise, the storage tool 104 can be implemented as a portion of other software programs configured to execute on the administrator system 102 or any other computing system in the network system 100. In either case, the storage tool 104 can be configured to include the necessary logic, commands, instructions, and protocols to perform the processes described below. Additionally, the storage tool 104 can be stored in computer readable storage devices or media (CD, DVD, hard drive, portable storage memory, etc.) whether local to the administrator system 102 or remotely located.

In embodiments, the storage tool 104 can be configured to identify storage systems 112 and 114 contained in the network system 100 and determine the performance and capabilities of the storage systems 112 and 114. To identify the storage systems 112 and 114, the storage tool 104 can be configured to directly query and examine the network system 100, the supervisory host 108, and the computing systems 110 in order to identify the storage systems 112 and 114. To enable this, the storage tool 104 can be configured to include the necessary logic, commands, instruction, and protocols to query and to examine each of the supervisory hosts 108 and the computing systems 110 in order to determine the storage systems 112 supported by those computing system and the necessary logic, commands, instructions, and protocols to query and to examine the storage system 114.

In embodiments, to also identify the storage systems 112 and 114, the storage tool 104 can be configured to communicate with other systems in the network system 100. The storage tool 104 can be configured to communicate with a network management system 116. The network management system 116 can be any type of network management application or tool, located separate from or incorporated in the administrator system 102, to securely communicate with the supervisory hosts 108 and the computing systems 110, to monitor the state of the supervisory hosts 108 and the computing systems 110, to retrieve and request data from the supervisory hosts 108 and the computing systems 110, and to manage and direct the supervisory hosts 108 and the computing systems 110. For example, the network management system 116 can be a "FUNC" server as described in U.S. patent application Ser. No. 12/130,424, filed May 30, 2008, entitled "SYSTEMS AND METHODS FOR REMOTE MANAGEMENT OF NETWORKED SYSTEMS USING SECURE MODULAR PLATFORM" (U.S. Patent Application Publication No. 2009/0300180) assigned to Red Hat™ Corporation, the disclosure of which is incorporated herein, in its entirety, by reference.

In embodiments, during identification, the storage tool 106 can be configured to collect details about the storage systems 112 and 114. The storage tool 106 can be configured to collect details of the storage systems 112 and 114 such as location and identification of the storage systems 112 and 114 (network identification and address of storage systems 114 or the supervisory host 108 and computing systems 110 containing the storage systems 112), identification of the a type of the storage systems 112 and 114 (individual storage device, array of storage devices), configuration of the storage systems 112 and 114 (e.g. scheme of the array of storage devices), information about storage devices contained in the storage systems 112 and 114 (manufacturer, model, interface type, etc.), and available storage of the storage systems 112 and 114.

In embodiments, once the storage systems 112 and 114 are identified, the storage tool 104 can be configured to determine overall performance and capabilities metrics of each storage system 112 and 114. The overall performance and capabilities metrics can include any conventional metric that describes how the storage system 112 and 114 performs in storing data. For example, the storage tool can determine failure rate, mean time to data loss (MTTDL), mean time to recovery (MTTR), unrecoverable bit rate error (UBE), write cache reliability, redundancy, space efficiency, and the like for each storage system 112 and 114. One skilled in the art will realize that the above list of performance and capabilities metrics is exemplary and the storage tool 104 can be configured to determine any conventional metric that describes how the storage systems 112 and 114 performs in storing data.

In embodiments, in order to determine the overall performance and capabilities metrics, the storage tool 104 can be configured to maintain a device record 118 and a configuration record 120. The storage tool 104 can be configured to maintain the device record 118 and configuration record 120 in a repository 122, such as a database. Additionally, the repository 122 can be stored in computer readable storage devices or media (CD, DVD, hard drive, portable storage memory, etc.) whether local to the administrator system 102 or remotely located.

In embodiments, the device record 118 can include standard performance and capabilities metrics for storage devices from various manufacturers. The standard performance and capabilities metrics can include metrics such as failure rate, MTTDL, MTTR, UBE, and write cache reliability which are dependent upon the particular storage device (e.g. manufacturer and model) and can be determined from testing the particular storage device. The storage tool 104 can be configured to acquire the standard performance and capabilities metrics in the device record 118 from the manufacturers of the storage devices or agencies or groups that test the performance and capabilities of storage devices.

In embodiments, the configuration record 120 can include standard performance and capabilities metrics for various configurations of storage systems 112 and 114 and can include factors that define how various configurations of storage systems 112 and 114 affects the standard performance and capabilities of the storage devices in the storage system 112 and 114. The standard performance and capabilities metrics for the various configurations of the storage systems 112 and 114 can include standard performance and capabilities metrics relevant to storage systems with an array of storage devices providing storage as one logical unit. The standard performance and capabilities metrics can include write cache reliability, redundancy, space efficiency, and the like. These standard performance and capabilities metrics depend on the particular scheme (e.g. RAID 0, RAID 1, RAID with hot swap, etc.) utilized to configure the array of storage devices. For example, the conventional scheme RAID 0, which can combine two or more storage devices together as one logical unit, has no redundancy metric because when one storage device fails the entire storage system fails. In this example, the conventional scheme RAID 0 has a space efficiency of n times the storage space of individual storage devices, where n is the number of storage devices. The storage tool 104 can be configured to acquire the standard performance and capabilities metrics in the device record 120 from the manufacturers utilizing a particular scheme or agencies or groups that developed and/or test a particular scheme.

In embodiments, the factors for the various configuration of the storage systems 112 and 114 can include factors that translate the standard performance and capabilities metrics of individual storage devices into the overall performance and capabilities metric relevant to the individual storage devices combined together as one logical unit. The factors can include factors that translate standard performance and capabilities metrics such as failure rate, MTTDL, MTTR, UBE, and the like. These factors depend on the particular scheme (e.g. RAID 0, RAID 1, RAID with hot swap, etc.) utilized to configure the array of storage devices. For example, the conventional scheme RAID 0, which can combine two or more storage devices together as one logical unit but when one storage device fails the entire storage system fails and, consequently, the failure rate of the array of individual storage devices is higher than the failure rate of each individual storage device by a factor, which is dependent upon the number of storage devices. The storage tool 104 can be configured to acquire the standard performance and capabilities metrics in the device record 120 from the manufacturers utilizing a particular scheme or agencies or groups that developed and/or test a particular scheme.

In embodiments, to determine the overall performance and capabilities metrics of a particular storage system 112, the storage tool 104 can be configured to search the device record 118 and retrieve the standard performance and capabilities metrics of each storage device in the particular storage system 112. Additionally, the storage tool 104 can be configured to search the configuration record 120 and retrieve the standard performance and capabilities metrics for the configuration of the particular storage system 112 and the factors that define how the configuration of the particular storage system 112 affects the standard performance and capabilities of the storage devices in the storage systems 112. In embodiments, for the particular storage system 112, the storage tool 104 can be configured to select the retrieved standard performance and capabilities metrics to be the overall performance and capabilities metrics and, if necessary, configured to apply the retrieved factors to the retrieved standard performance and capabilities metrics to determine the overall performance and capabilities metrics for the particular storage system 112.

In embodiments, for example, if the particular storage system 112 is an individual storage device, the storage tool 104 can determine the overall performance and capabilities metrics to be the standard performance and capabilities metrics retrieved from the device record 118, which are associated with that individual storage device. Likewise, for example, if the particular storage system 112 is an array of storage devices, the storage tool 104 can be configured to select the retrieved standard performance and capabilities metrics from the configuration record 120, which are associated with the scheme used to combine the devices, and, if necessary, configured to apply the retrieved factors from the configuration record 120 to the retrieved standard performance and capabilities metrics retrieved from device record 118 to determine the overall performance and capabilities metrics for the particular storage system 112.

In embodiments, once the overall performance and capabilities metrics are determined for the storage systems 112 and 114, the storage tool 104 can be configured to store the overall performance and capabilities metrics of the storage systems 112 and 114 with the de-tails of the storage systems in an inventory record 124. The inventory record 124 can include, for each storage system 112 or 114, the details of the storage systems such as location and identification of the storage systems 112 or 114, type of the storage systems 112 or 114, configuration of the storage systems 112 or 114, information about storage devices contained in the storage systems 112 or 114, available storage of the storage systems 112 or 114, and the overall performance and capabilities metrics. The storage tool 104 can be configured to maintain the inventory record 124 in the repository 122.

FIG. 2 illustrates an exemplary diagram on the inventory record 124, according to various embodiments. As illustrated, the inventory record 124 can be configured as a table 200 which includes various rows 202 and columns 204. The storage tool 104 can store in each row 202 the information associated with a particular storage system 112 or 114. The columns 204 can identify the type of the information included in the rows 202.

In embodiments, once the storage systems 112 and 114 have been identified and the overall performance and capabilities metrics determined, the storage tool 104 can be configured to identify storage systems 112 and 114 based on the overall performance and capabilities metrics. The storage tool 104 can be configured to receive a request to identify storage systems 112 and 114 that meet one or more overall performance and capabilities metrics. The storage tool 104 can be configured to receive the request from a user of the administrator system 102. To achieve, the storage tool 104 can be configured to include the necessary logic, commands, instructions, and protocols to generate and provide command line or graphical user interfaces (GUIs) 126 to receive the request to identify storage systems 112 and 114 based on overall performance and capabilities metrics.

For example, a user of the administrator system 102 can desire to install software programs on a computing system in the network system 100. The user can desire that the computing system have a particular redundancy because the software program is critical and data loss is undesirable. As such, the storage tool 104 can provide the command line or GUIs 126 that allow the user to request the identity of storage systems 112 and 114 that have at least the particular redundancy.

In embodiments, the storage tool 104 can be configured to allow software programs to request the identity of the storage systems 112 and 114 that meet one or more overall performance and capabilities metrics. The storage tool 104 can be configured to include an application programming interface (API) that allows the software programs to call the storage tool 104 and provide the request. For example, the administrator system 102 can include a software program 129, such as a package manager or configuration manager. The software program 129 can be attempting to install software programs on a computing system in the network system 100. The software program 129 can be configured to install the software programs on a computing system that has a particular redundancy. As such, the storage tool 104 can be invoked and receive the request via the API.

In embodiments, to determine the storage systems 112 and 114 that meet the one or more overall performance and capabilities metrics, the storage tool 104 can be configured to search the inventory record 124 and identify storage systems 112 and 114 that meet the one or more overall performance and capabilities metrics. The storage tool 104 can be configured to provide a report of the identified storage systems to an originator of the request, such as the user of the administrator system 102 and/or the software program 129. For instance, the storage tool 104 can be configured to provide the report via the command line or GUIs 126 for receipt by the user. Likewise, the storage tool 104 can be configured to provide the report via the API for receipt by the software program 129.

Figure 3:
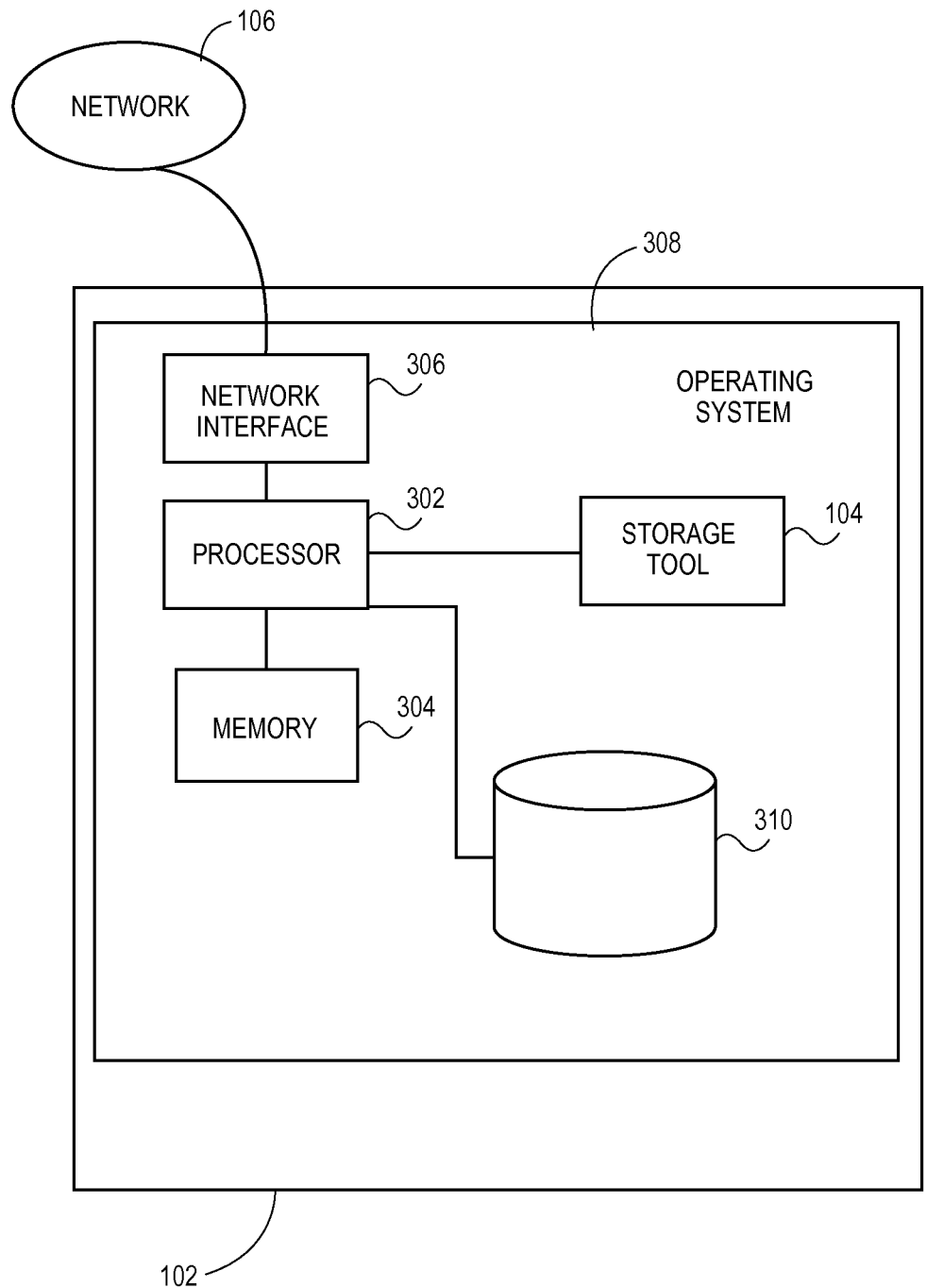
FIG. 3 illustrates an exemplary hardware configuration for an administrator computing system, according to various embodiments.

FIG. 3 illustrates an exemplary diagram of hardware and other resources that can be incorporated in the administrator system 102 and configured to communicate with the with the network system 100 via one or more networks 106, according to embodiments. In embodiments as shown, the administrator system 102 can comprise a processor 302 communicating with memory 304, such as electronic random access memory, operating under control of or in conjunction with operating system 308. Operating system 308 can be, for example, a distribution of the Linux operating system, such as Red Hat Enterprise Linux, Fedora, etc., the Unix™ operating system, or other open-source or proprietary operating system or platform. Processor 302 also communicates with one or more computer readable storage devices or media 310, such as hard drives, optical storage, and the like. Processor 302 further communicates with network interface 306, such as an Ethernet or wireless data connection, which in turn communicates with one or more networks 106, such as the Internet or other public or private networks.

Processor 302 also communicates with the storage tool 104, to execute control logic and allow perform the identification of storage systems as described above and below. Other configurations of the administrator system 102, associated network connections, and other hardware and software resources are possible.

While FIG. 3 illustrates the administrator system 102 as a standalone system including a combination of hardware and software, the administrator system 102 can include multiple systems operating in cooperation. The storage tool 104 can be implemented as a software application or program capable of being executed by the administrator system 102, as illustrated, or other conventional computer platforms.

Likewise, the storage tool 104 can also be implemented as a software module or program module capable of being incorporated in other software applications and programs. In any example, the storage tool 104 can be implemented in any type of conventional proprietary or open-source computer language. When implemented as a software application or program code, the storage tool 104 can be stored in a computer readable storage medium, such as storage 310, accessible by the administrator system 102. During execution, a copy of the storage tool 104 can be stored in the memory 304.

Figure 4:
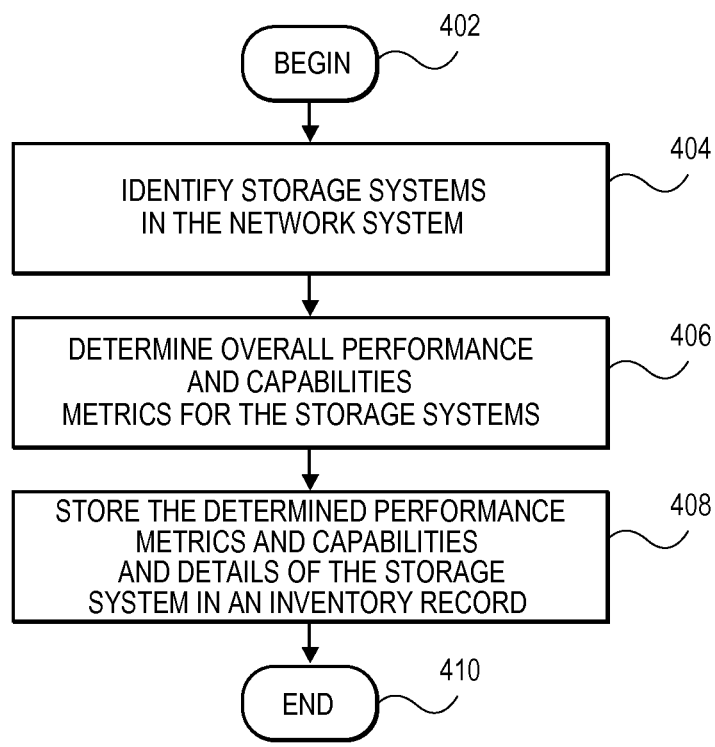
FIG. 4 illustrates a flowchart of an exemplary process for creating an abstract view of storage systems, according to various embodiments.

FIG. 4 illustrates an exemplary flow diagram of a process for creating an abstract view of storage systems in a network system 100, according to embodiments of the present teachings. In 402, the process can begin. In 404, the storage tool 104 can identify the storage systems 112 and 114 in the network system 100. For example, the storage tool 104 can directly query the network system 100 or communicate with the network management system 116 to identify the storage systems 112 and 114. The storage tool 106 can collect details of the storage systems 112 and 114 such as location and identification of the storage systems 112 and 114 (network identification and address of storage systems 114 or the supervisory host 108 and computing systems 110 containing the storage systems 112), identification of the a type of the storage systems 112 and 114 (individual storage device, array of storage devices), configuration of the storage systems 112 and 114 (e.g. scheme of the array of storage devices), information about storage devices contained in the storage systems 112 and 114 (manufacturer, model, interface type, etc.), and available storage of the storage systems 112 and 114.

In 406, the storage tool 104 can determine the overall performance and capabilities metrics for the storage systems 112 and 114. The storage tool 104 can search the device record 118 and retrieve the standard performance and capabilities metrics of each storage device in the storage systems 112 and 114. Additionally, the storage tool 104 can search the configuration record 120 and retrieve the standard performance and capabilities metrics for the configuration of the storage systems 112 and 114 and the factors that define how the configuration of the storage systems 112 and 114 affects the standard performance and capabilities of the storage devices in the storage systems 112. For the storage systems 112 and 114, the storage tool 104 can select the retrieved standard performance and capabilities metrics to be the overall performance and capabilities metrics and, if necessary, configured to apply the retrieved factors to the retrieved standard performance and capabilities metrics to determine the overall performance and capabilities metrics for the storage systems 112 and 114.

In 408, the storage tool 104 can store the overall performance and capabilities metrics and the details of the storage systems 112 and 114 in an inventory record 124. For example, the inventory record 124 can include, for each storage system 112 or 114, the details of the storage systems such as location and identification of the storage systems 112 or 114, type of the storage systems 112 or 114, configuration of the storage systems 112 or 114, information about storage devices contained in the storage systems 112 or 114, available storage of the storage systems 112 or 114, and the overall performance and capabilities metrics.

In 410, the process can end, but the process can return to any point and repeat.

Figure 5:
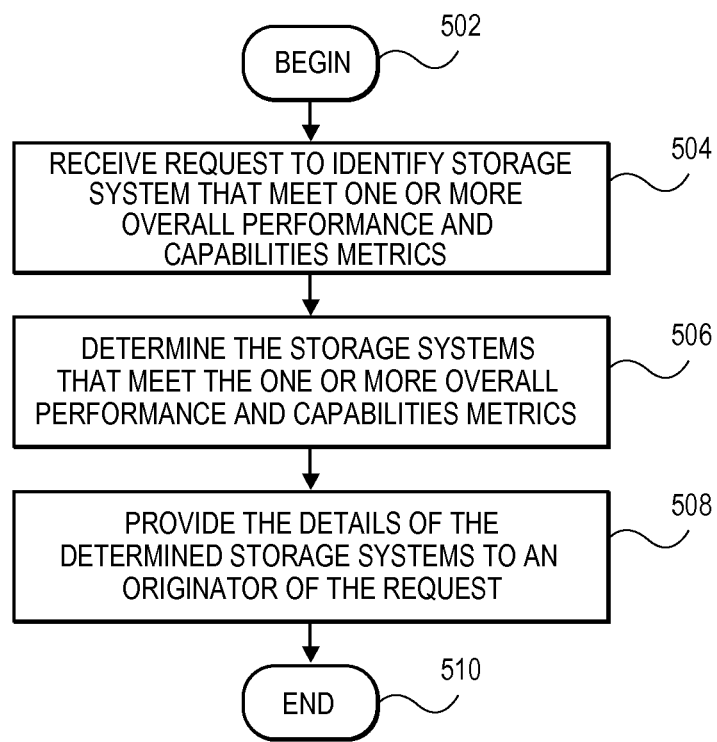
FIG. 5 illustrates a flowchart of an exemplary process for identifying storage systems utilizing the abstract view, according to various embodiments.

FIG. 5 illustrates an exemplary flow diagram of a process for identifying storage systems from the abstract view of storage systems in the network system 100, according to embodiments of the present teachings. In 502, the process can begin. In 504, the storage tool 104 can receive a request to identify storage systems 112 and 114 that meet one or more overall performance and capabilities requirements. For example, the storage tool 104 can receive the request from a user of the administrator system 102 or a software program executing in the network system 100.

In 506, the storage tool 104 can determine the storage systems 112 and 114 that meet the one or more overall performance and capabilities requirements. For example, the storage tool 104 can search the inventory record 124 and identify storage systems 112 and 114 that meet the one or more overall performance and capabilities metrics. Likewise, for example, the storage tool 104 can perform the processes of identifying storage systems 112 and 114 and determining the overall performance and capabilities metrics of the storage systems 112 and 114, as described above, at the time of the request in real-time, and identify storage systems 112 and 114 that meet the one or more overall performance and capabilities metrics from the determined overall performance and capabilities metrics.

In 508, the storage tool 104 can provide the details of the determined storage systems 112 and 114 to an originator of the request. For example, the storage tool 104 can provide the details in a report to the user of the administrator system 102 and/or the software program executing in the network system 100.

In 510, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a 'flamer similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
    identifying a standard performance and capability metric of a first storage device and of a separate second storage device contained in a storage system;
    identifying configuration information of the separate first and second storage devices, wherein the configuration information defines how a configuration of the first and second storage devices affects the standard performance and capability metrics of the first and second storage devices, the configuration comprising a combination of the first and second storage devices together into a single logical storage unit;
    applying the configuration information to the standard performance and capability metric to determine an actual performance and capability metric of the first and second storage devices when combined together into the single logical storage unit; and
    comparing, by a processor, a performance and capabilities requirement to the actual performance and capability metric to determine that the storage system meets the performance and capabilities requirement.

2. The method of claim 1, further comprising:
    receiving a request to identify the storage system of a plurality of storage systems that meets the performance and capabilities requirement.

3. The method of claim 2, further comprising:
    providing an indication of the storage system to an originator of the request.

4. The method of claim 1, wherein determining the actual performance and capability metric of the first and second storage devices comprises maintaining a record of a plurality of storage systems associated with the actual performance and capability metric.

5. The method of claim 1, wherein determining the actual performance and capability metric of the first and second storage devices comprises querying a plurality of storage systems to determine configuration information of storage devices contained in the plurality of storage systems.

6. The method of claim 5, wherein determining the actual performance and capability metric of the first and second storage devices, further comprises:
    maintaining a first record of the standard performance and capability metric;
    maintaining a second record of the configuration information of the first and second storage devices; and
    determining the actual performance and capability metric of the storage system in view of the first record and the second record.

7. The method of claim 1, wherein the performance and capabilities requirement comprises one of a failure rate, a mean time to data loss (MTTDL), a mean time to recovery (MTTR), an unrecoverable bit rate error (UBE), a write cache reliability, a redundancy, a RAID level, or a space efficiency.

8. A method comprising:
    identifying a storage system in a network and a configuration of separate first and second storage devices contained in the storage system;
    identifying a standard performance and capability metric of the first and second storage devices;
    identifying, by a processor, configuration information of the separate first and second storage devices, wherein the configuration information defines how the configuration of the first and second storage devices affects the standard performance and capability metric, the configuration comprising a combination of the first and second storage devices together into a single logical storage unit; and
    applying the configuration information to the standard performance and capability metric to determine an actual performance and capability metric of the storage system when the first and second storage devices are combined together into the single logical storage unit.

9. The method of claim 8, further comprising:
    storing the actual performance and capability metric in a storage device.

10. The method of claim 8, wherein determining the actual performance and capability metric of the storage system, comprises:
    maintaining a first record of the standard performance and capability metric of the first and second storage devices;
    maintaining a second record of the configuration information of the first and second storage devices; and determining the actual performance and capability metric of the storage system in view of the first record and the second record.

11. The method of claim 8, wherein the actual performance and capability metric comprises at least one of a failure rate, a mean time to data loss (MTTDL), a mean time to recovery (MTTR), an unrecoverable bit rate error (UBE), a write cache reliability, a redundancy, a RAID level, or a space efficiency.

12. The method of claim 8, wherein identifying the storage system in the network and the configurations of the storage device contained in the storage system comprises querying the storage system and the configuration of the first and second storage devices contained in the storage system.

13. The method of claim 8, wherein identifying the storage system and the configuration of the first and second storage devices contained in the storage system comprises requesting a network management system to query the network to identify the storage system and the configuration of the first and second storage devices contained in the storage system.

14. A non-transitory computer readable storage medium comprising instructions for causing a processor to perform operations comprising:
- identifying a standard performance and capability metric of a first storage device and of a separate second storage device contained in a storage system;
- identifying configuration information of the separate first and second storage devices, wherein the configuration information defines how a configuration of the first and second storage devices affects the standard performance and capability metrics of the first and second storage devices, the configuration comprising a combination of the first and second storage devices together into a single logical storage unit;
- applying the configuration information to the standard performance and capability metric to determine an actual performance and capability metric of the first and second storage devices when combined together into the single logical storage unit; and
- comparing, by the processor, a performance and capabilities requirement to the actual performance and capability metric to determine that the storage system meets the performance and capabilities requirement.

15. The non-transitory computer readable storage medium of claim 14, the operations further comprising:
- receiving a request to identify the storage system of a plurality of storage systems that meets the performance and capabilities requirement.

16. The non-transitory computer readable storage medium of claim 15, the operations further comprising:
- providing an indication of the storage system to an originator of the request.

17. The non-transitory computer readable storage medium of claim 14, wherein determining the actual performance and capability metric of the first and second storage devices comprises maintaining a record of a plurality of storage systems associated with the actual performance and capability metric.

18. The non-transitory computer readable storage medium of claim 14, wherein determining the actual performance and capability metric of the first and second storage devices comprises querying a plurality of storage systems to determine configuration information of storage devices contained in the plurality of storage systems.

19. The non-transitory computer readable storage medium of claim 18, wherein determining the actual performance and capability metric of the storage device, further comprises:
- maintaining a first record of the standard performance and capability metric;
- maintaining a second record of the configuration information of the first and second storage devices; and
- determining the actual performance and capability metric of the storage system in view of the first record and the second record.

20. The non-transitory computer readable storage medium of claim 14, wherein the performance and capabilities requirement comprises one of a failure rate, a mean time to data loss (MTTDL), a mean time to recovery (MTTR), an unrecoverable bit rate error (UBE), a write cache reliability, a redundancy, a RAID level, or a space efficiency.

21. A system comprising:
- a processor;
- a memory coupled to the processor; and
- a storage tool, executable by the processor from the memory, to:
  - identify a standard performance and capability metric of a first storage device and of a separate second storage device contained in a storage system;
  - identify configuration information of the separate first and second storage devices, wherein the configuration information defines how a configuration of the first and second storage devices affects the standard performance and capability metrics of the first and second storage devices, the configuration comprising a combination of the first and second storage devices together into a single logical storage unit;
  - apply the configuration information to the standard performance and capability metric to determine an actual performance and capability metric of the first and second storage devices when combined together into the single logical storage unit; and
  - compare a performance and capabilities requirement to the actual performance and capability metric to determine that the storage system meets the performance and capabilities requirement.

22. The system of claim 21, the storage tool further to:
- receive a request to identify the storage system of a plurality of storage systems that meets the performance and capabilities requirement.

23. The system of claim 22, the storage tool further to:
- provide an indication of the storage system to an originator of the request.

* * * * *